(12) United States Patent
Rueb

(10) Patent No.: US 10,410,419 B2
(45) Date of Patent: Sep. 10, 2019

(54) LASER PROJECTION SYSTEM WITH VIDEO OVERLAY

(71) Applicant: VIRTEK VISION INTERNATIONAL INC., Waterloo (CA)

(72) Inventor: Kurt D. Rueb, Kitchener (CA)

(73) Assignee: Virtek Vision International ULC (CA)

(*) Notice: Subject to any disclaimer, the term of this patent is extended or adjusted under 35 U.S.C. 154(b) by 181 days.

(21) Appl. No.: 15/058,867

(22) Filed: Mar. 2, 2016

(65) Prior Publication Data
US 2016/0260259 A1 Sep. 8, 2016

Related U.S. Application Data

(60) Provisional application No. 62/126,756, filed on Mar. 2, 2015.

(51) Int. Cl.
| | |
|---|---|
| *G06T 19/00* | (2011.01) |
| *G06T 7/00* | (2017.01) |
| *H04N 9/31* | (2006.01) |
| *G06T 7/73* | (2017.01) |

(52) U.S. Cl.
CPC .............. *G06T 19/006* (2013.01); *G06T 7/73* (2017.01); *H04N 9/3129* (2013.01); *H04N 9/3161* (2013.01); *H04N 9/3185* (2013.01); *H04N 9/3194* (2013.01); *G06T 2219/2004* (2013.01)

(58) Field of Classification Search
CPC . G06T 19/006; G06T 2219/2004; G06T 7/73; H04N 9/3129; H04N 9/3161; H04N 9/3185; H04N 9/3194
See application file for complete search history.

(56) References Cited

U.S. PATENT DOCUMENTS

| | | | | |
|---|---|---|---|---|
| 2012/0303336 A1* | 11/2012 | Becker | ..................... | B64F 5/00 703/1 |
| 2013/0250094 A1* | 9/2013 | Rueb | ..................... | G01C 11/00 348/94 |
| 2013/0265330 A1* | 10/2013 | Goto | ..................... | G06T 19/006 345/632 |
| 2014/0160115 A1* | 6/2014 | Keitler | .................. | G01B 11/00 345/419 |

(Continued)

OTHER PUBLICATIONS

Krumenaker, Virtual Assembly, Feb. 1997, MIT Technology Review, Feb./Mar. 1997 Issue.*

*Primary Examiner* — Francis Geroleo
(74) *Attorney, Agent, or Firm* — Miller Canfield

(57) ABSTRACT

A method of identifying accurate location of a component onto a workpiece is disclosed. A laser projector projects laser images relative to the workpiece. An imaging device generates a video image and a display device displays the video image from a view of the imaging device. The display device generates a video image from a view of the workpiece by the imaging device. The laser projector projects a plurality of laser images relative to the workpiece and the display device registers the view of the imaging device relative to the workpiece from the plurality of laser images. The display device generates a virtual image of the component upon the video image of workpiece. The virtual image of the component disposed in a geometrically accurate location upon the video image of the workpiece.

16 Claims, 2 Drawing Sheets

(56) References Cited

U.S. PATENT DOCUMENTS

2014/0160162 A1\* 6/2014 Balachandreswaran ..................... G03B 17/54
  345/633
2016/0078682 A1\* 3/2016 Shikoda ................. G06Q 10/06
  345/633

\* cited by examiner

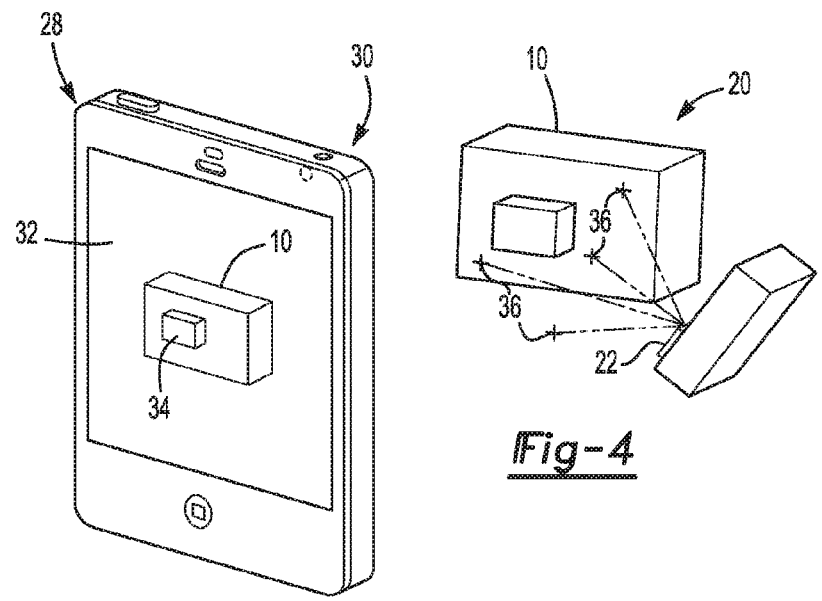
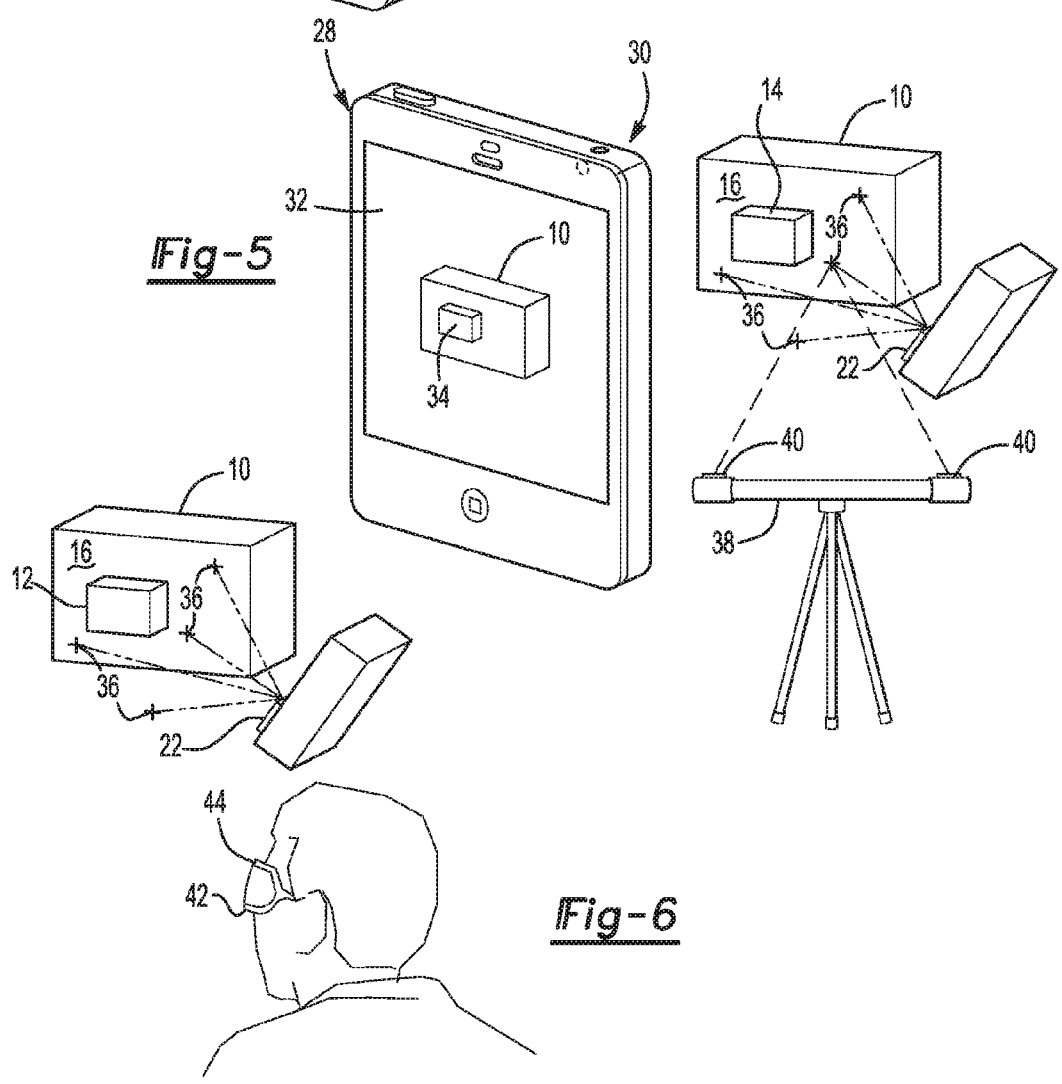

LASER PROJECTION SYSTEM WITH VIDEO OVERLAY

PRIOR APPLICATION

The present application claims priority to U.S. Provisional Patent Application No. 62/126,756 filed on Mar. 2, 2015, the contents of which are included herein by reference.

TECHNICAL FIELD

The present application relates generally to a laser projection and video system for use in an industrial environment. More specifically, the present application relates to the use of an augmented video overlay of a component on a workpiece in an image generated with the assistance of a laser projection system.

BACKGROUND

Manufacturers of complex workpieces and assemblies requiring a high degree of assembly accuracy are continuously looking for improved processes with the use of assembly aids. While conventional manufacturing processes have historically relied on mechanical fixtures as assembly aids that register to a workpiece at a fixed location, these mechanical fixtures have proven difficult to work with and do not provide sufficient accuracy whenever decreasing tolerances are required of complex devices. Alternatively, manual measurement of attachment locations using various reference features or templates applied to the workpiece have also been used. The expense, labor intensive requirements, and propensity for error continue to be a challenge to manufacturing companies.

FIG. 1 shows a schematic view of a workpiece 10. The workpiece 10 includes a component (or subassembly) 12 mated to a surface 16 at a geometrically significant location. As set forth above, accurate location of the component 12 to the workpiece 10 has been achieved with the use of a fixture. Accuracy is particularly inadequate when the fixture is large or heavy making it difficult for an operator to position properly on the workpiece 10.

More recently, optical templates have been projected directly onto workpieces providing an optical image to locate placement a component onto the workpiece 10. This is represented in FIG. 2 where the workpiece 10 is subject to a laser projector 12 that projects a template 14 onto a pre-determined surface 16 of the workpiece. One such example of a laser projector 12 used to project a template 14 onto workpiece 10 is disclosed in U.S. Pat. No. 9,200,899 LASER PROJECTION SYSTEM AND METHOD, the contents of which are incorporated herein by reference. In this example, the position of the projector 12 relative to the workpiece along with a three dimensional geometry of the workpiece and profile of the attachment location are predetermined. Making use of these elements, an outline of an attachment profile in the way of an optical template 14 is accurately projected onto the desired workpiece surface 16.

Systems used to project templates 14 onto a workpiece have proven highly accurate. However, there are limitations to relying merely on a laser projection of a template 13 restricting broader use of optical templates in the marketplace. For example, it is sometimes difficult or impossible to locate a workpiece within a three dimensional coordinate system relative to a laser projector. In addition, arbitrary assembly tasks traditionally make use of mechanical fixtures placed in arbitrary three dimensional locations are not always uniquely suited to laser projection templates 14. In some circumstances, a support surface is available, but the only accurate projection of a profile template is capable upon a first surface of the workpiece. In addition, the three dimensional component affixed to a workpiece prevents projection of a pattern that "looks like" the component when it is necessary to verify correct component selection, placement or orientation.

Projection of a laser template 14 is typically flattened to be received upon a surface of a workpiece. Presently, laser projectors are incapable of providing an accurate focal point at a location spaced from the surface 16 of a workpiece. This prevents projection of a true location of the component according to a computer aided design model that is three dimensional or includes relevant geometrically important features that would be floating in space above the surface 16 of the workpiece 10.

Therefore, it would be desirable to provide a method for overlaying an image of a component to be assembled in a workpiece that provides three dimensional characteristics of that component relative to the workpiece.

SUMMARY

A method of identifying accurate assembly of a component onto a workpiece includes use of a laser projector for projecting a laser image relative to the workpiece. An imaging device generates a video image of the workpiece that is displayed on a display device. The display device generates a video image of the workpiece generated by the imaging device. A laser projector projects a plurality of laser images relative to the workpiece and the display device registers the view of the imaging device relative to the workpiece from the plurality of laser images. The display device generates a virtual image of component upon the video image of the workpiece. The virtual image of the component is disposed in a geometrically accurate location upon the video image of the workpiece.

The present invention is a significant enhancement to the use of laser projectors as assembly aids. For the first time, the benefits of laser projection relative to a workpiece are combined with an imaging device and a display device where a virtual image of a component to be assembled to the workpiece can be viewed by an operator. The accurate measurement made possible by a laser projector provides the ability to generate a three dimensional image of the component in a geometrically accurate location and orientation on a workpiece enabling an operator to both properly locate a component and to verify important features of that component spaced from a surface of the workpiece that are disposed in the geometrically accurate location.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 shows a computer aided design overlay with arbitrary laser alignment references;

FIG. 5 shows laser alignment references projected onto a workpiece using an optical measurement system; and FIG. 6 shows an alternative embodiment of the method of the present invention using virtual reality goggles.

DETAILED DESCRIPTION

Figure 1:
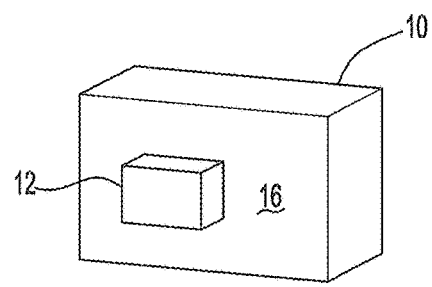
FIG. 1 represents a workpiece and a component of the workpiece.
Figure 2:
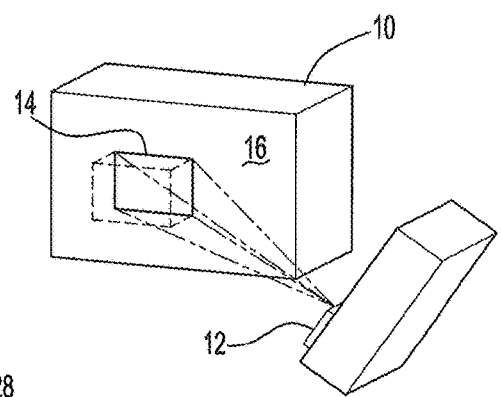
FIG. 2 represents a prior art laser projector projecting a template of the component upon the workpiece.
Figure 3:
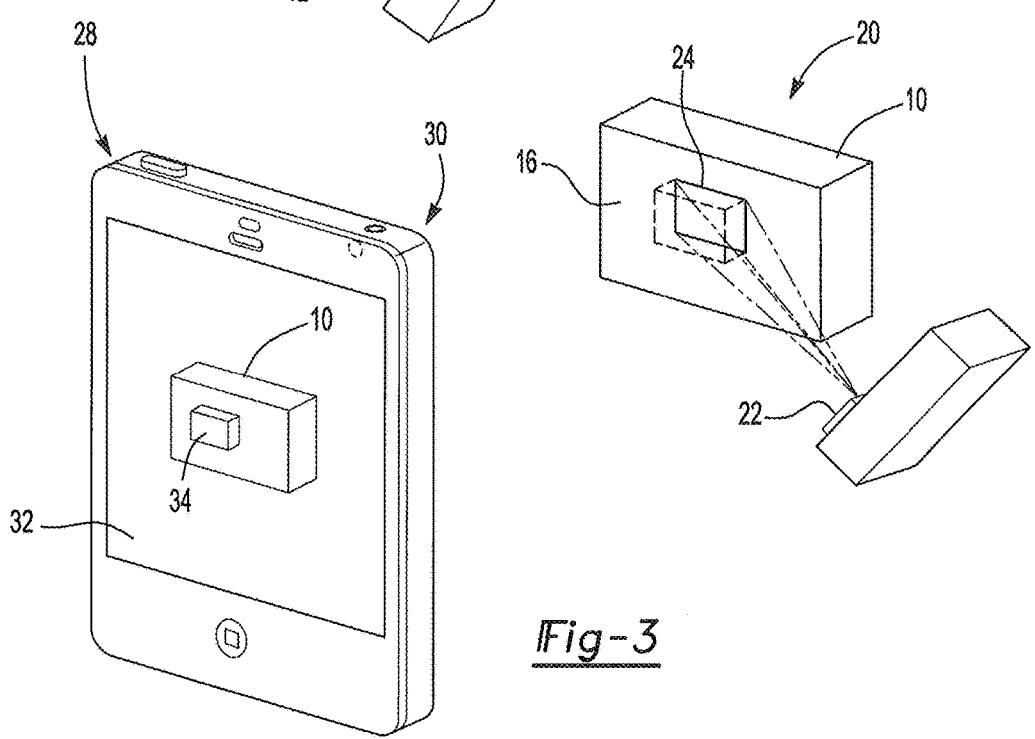
FIG. 3 represents a computer aided design overlay using laser alignment.

Referring to FIG. 3, a laser projection and video overlay assembly used to practice the method of the present invention is generally shown at 20. The workpiece 10 defines the surface 16 onto which the component 12 is assembled (represented in FIG. 1). A laser projector 22 projects a laser template 24 onto the surface 16 of the workpiece at geometrically relevant location.

A tablet 28 includes an imaging device 30 and a display device 32. As is understood by those of ordinary skill in the art, the imaging device on a tablet 28 takes the form of a camera and the display device 32 takes the form of a video screen. As is also known to those of ordinary skill in the art, the imaging device 30 is disposed upon on an opposite side of the table 28 from a display device 32. The description of a tablet is merely exemplary, and other devices are within the scope of this invention, including but not limited to, a smart phone, virtual reality apparatus, virtual reality goggles, separable cameras and video screens, and any device or combination of devices capable of both generating an image of the workpiece 10 and displaying an image of the workpiece 10. While "tablet" is used throughout the specification, it should be understood that each of these devices are within the scope of the invention.

In this embodiment, the laser template 24 is within the field of view of the imaging device 30 along with the workpiece 10. This creates the illusion that the display device 32 provides a window into the scene beyond the tablet 28. Further, in this embodiment, the tablet 28 includes a processor capable of performing necessary algorithms to monitor the projected template 24 and calculate the relevant view or viewpoint of the imaging device 30. Once registration of the view by the imaging device 30 is determined, a virtual overlay 34 based upon computer aided design ("CAD") is performed upon the live video stream of the workpiece 10. Further, even though the tablet 28 is moved, the processor continuously updates a geometric location of the workpiece 10 while simultaneously updating the video overlay 34 based upon the CAD models. As such, generally photo realistic renderings of the component 12 disposed at the desired location of an assembled component 12 is represented in the display device 32. The video overlay 34 of the present invention is not subject to the constraints of a projected template upon a surface 16 of a workpiece 10.

A further embodiment is shown generally at 34 of FIG. 4. During assembly, it is possible that a template 24 projected by the laser projector 22 could become occluded when the component 12 is placed onto the attachment location as indicated by the laser template 24. Therefore, the accuracy and usability of the overlay 34 could be reduced. In this embodiment, the laser projector 22 is programmed to project arbitrary laser spots 36 toward the workpiece 10. The imaging device 30 views the laser spots 36 and the processor registers the view of the imaging device 30 to accurately depict the overly 34 on the display device 32. The arbitrary projected pattern of at least four laser spots 36 is believed to provide the most accurate overlay 34. However, projecting additional laser spots 36 provides beneficial redundancy and enhances dynamic relocation of the video overlay 34. Additionally, continuous random projection of arbitrary laser spots 36 reduces the potential of occlusion by an operator or an assembled component 12 when mated to the workpiece 10.

It could be desirable to project laser spots 36 not only on the surface 16 of the workpiece, but also onto environmental surfaces to further facilitate accurate location of the workpiece 10 is disposed in a three dimensional coordinate system. Rapid, dynamic recalculation of the overlay 34 on the image of the workpiece 10 shown on the display device 32 is also achieved by the processor in this alternative embodiment to account for movement of the tablet 28 by an operator.

Additional enhancements are desirable when surfaces of the environment in which the workpiece 10 is disposed are unknown. In such circumstances, the use of a measuring device 38 is desirable as best represented in FIG. 5. In one such example, the measuring device 38 includes optical coordinate measuring using cameras 40 spaced apart a known distance to triangulate an image of each of the laser spot 36. In this manner, the measuring device 38 identifies an accurate location of the surface 16 of the workpiece 10 onto which the component 12 is to be mated. An additional enhancement makes use of placing retro-reflective targets onto the workpiece 10 at known locations or by using a hand held probe to measure reference features of the workpiece 10 as disclosed in U.S. Pat. No. 9,200,899, the contents of which are included herein by reference. Therefore, projected laser spots 36 can effectively be positioned arbitrarily to fall upon known or unknown workpiece 10 surfaces or other surfaces in the general environment, which will provide necessary visibility within the view of the imaging device 30.

The augmented or virtual reality provided by the present invention creates an illusion of a window or portal to an existing environment that is enhanced by CAD graphics onto a live video stream. While tablets and smart phones have been disclosed above, an additional embodiment, as represented in FIG. 6 includes video goggles 42 having an integrated imaging device 44. Many of these devices, now available in the market include processing capabilities and necessary sensors including, accelerometers and MEMS gyroscopes to rapidly register a video image and process CAD data to accurately generate augmented reality as set forth above. This provides the ability to introduce three dimensional graphic representations of a CAD generated component 12 that responds to movements of the tablet 28, projector 22 or other device at high frequency so that the virtual component 12 appears to be an integral part of the environment at a geographically accurate location on the workpiece 10.

The approaches set forth above provide a number of benefits over traditional laser template projection. Flicker restrictions are eliminated providing a high level of extensive detail, including fiber orientation, or even special instructions, all of which are overlaid on an image generated by the display device 32. Furthermore, visibility of outlines is not limited by reflectivity of background material. As such, a desired outline is always most visible feature on any graphic combination of color, blinking or other highlighting to convey features of a template outline by the display device 32. The use of augmented video images generated by a display device 32 are most effective when an application is particularly adapted to overcome potential awkwardness of remote viewing, and resolution of a video image. For example, direct laser projection for ply layup is extremely affective with proper imaging device location and orientation.

Still further enhancements are achievable by way of the IRIS™ Spatial Positioning System provided by Virtek Vision International, Inc. when additional degrees of accuracy might require restricting the field of view to a very local, often featureless area of a workpiece 10. The Spatial Positioning System enables any spot projected by the laser projector 22 that is measured by the measuring device 38 or spatial locator to become a reference to register the video stream with a high degree of accuracy.

An example includes attachment of a rectangular component 12 to a workpiece 10. In this example, the laser projector 22 projects both a template 24 and arbitrary laser spots 36 onto the workpiece 10 and surrounding environment. The virtual component 12, based upon CAD data, is overlaid on the actual attached part in the video stream on the display device 32, by registering the imaging device 30 from the arbitrary laser spots 36 as long as the laser spots 36 remain in view of the display device 32. Of course, the arbitrary laser spots 36 are also located by the Spatial Positioning System, which allows the laser or laser to rapidly reposition the reference locations to maintain the arbitrary laser spots 36 in view of the imaging device 30. In this manner, movement of the tablet, smartphone or goggles becomes irrelevant because the registration is maintained to achieve accurate augmentation.

It should be understood by those of ordinary skill in the art that the description set forth above, while disclosing apparatus and methods for accurately locating a component 12 onto a workpiece 10, includes broader aspects of the apparatus and method are included. For example, the laser projection and video overlay assembly 20 disclosed above provide the ability to identify accurate location of a drilled or machined aperture (not shown) into the workpiece. Further, the laser projection and video overlay assembly 20 identify to an operator whether the correct component 12, fastener or the like has been assembled to the workpiece 10.

An additional aspect of the present invention is the ability to obscure laser spots 36 or other laser images projected by the laser projector 22. In some instances, the laser spots 36 could cause confusion, or otherwise be undesirable when shown in the display device 32. One example is if the virtual overlay 34 is used for entertainment purposes. In this example, reduces the impact of the virtual overlay 34. In the case, the tablet 28 is programmed to obscure the laser spots 36.

Obviously, many modifications and variations of the present invention are possible in light of the above teachings. The foregoing invention has been described in accordance with the relevant legal standards; thus, the description is merely exemplary than limiting in nature. Variations and modifications to the disclosed embodiment may become apparent to those skilled in the art and do come within the scope of this invention. Accordingly, the scope of a legal protection afforded this invention can only be determined by studying the following claims.

What is claimed is:

1. A method of identifying accurate assembly of a component onto a workpiece; comprising the steps of:
    providing a laser projector for projecting a laser pattern relative to the workpiece;
    providing an. imaging device and a display device for displaying a video image from a view by said imaging device;
    registering a location of said laser projector, said imaging device and said display device relative to each other within a three dimensional coordinate system defined by the workpiece;
    said display device generating a video image from a view of the workpiece by the imaging device;
    said laser projector projecting the laser pattern in a known three dimensional position relative to the workpiece and said display device registering the view of said imaging device relative to the workpiece from the laser pattern; and
    said display device generating a virtual overlay of the component upon the video image of workpiece, with said virtual overlay of the component disposed in a known three dimensional position relative to the video image of the workpiece shown by the display device.

2. The method set forth in claim 1, forth including a step of projecting a plurality of laser spots onto arbitrary location upon the workpiece for determining a geometric relationship between the workpiece, said laser projector and said imaging device.

3. The method set forth in claim 1, wherein said step of projecting a laser pattern onto the workpiece is further defined by projecting a laser template onto the workpiece at known three dimensional location on the workpiece.

4. The method set forth in claim 3, wherein said step of generating a virtual image of the component upon the video image of workpiece further includes a step of determining relative viewpoint of said imaging device from the laser template projected onto the workpiece by the laser projector.

5. The method set forth in claim 1, wherein said step of providing an imaging device and a display device is further defined by providing at least one of a tablet; smart phone, or video goggles.

6. The method set forth in claim 1, wherein said step of projecting a plurality of laser images relative to the workpiece is further defined by projecting a plurality of laser spots onto arbitrary environmental locations.

7. The method set forth in claim 1, further including a step of dynamically repositioning projection of the laser pattern.

8. The method set forth in claim 1, wherein said step of projecting a laser pattern relative to said workpiece is further defined by repositioning the laser pattern according to a current view of said imaging device.

9. The method set forth in claim 1, further including a step of said imaging device, said display device and said laser projector each communicating wirelessly.

10. The method set forth in claim 1, further including a step of providing an optical measuring device for determining a location of the laser pattern projected onto the workpiece by said laser projector.

11. The method set forth in claim 1, further including a step of affixing reflective targets onto the workpiece and locating said laser projector relative to the workpiece by scanning the reflective targets.

12. The method set forth in claim 11, further including the step of said optical measuring system determining location and orientation of the workpiece from reflections of said reflective targets.

13. The method set forth in claim 1, Wherein further including a step of said optical measurement system determining location and orientation of the workpiece from a handheld probe.

14. The method set forth in claim 1, wherein said step of said laser projector projecting a laser image relative to said workpiece is further defined by said laser projector projecting a plurality of laser images relative to said workpiece.

15. The method set forth in claim 1, further including a step of said laser projector projecting laser spots for locating the workpiece relative to the laser pattern is obscured in said display device by the component after the component is affixed to the workpiece.

16. The method set forth in claim 1, further including the step of providing at least one of an accelerometer and a gyroscope to register a video image and process computer aided design data for generating augmented reality of a high frequency projector or tablet movement.

* * * * *